United States Patent
Tayama et al.

[11] Patent Number: 5,311,441
[45] Date of Patent: May 10, 1994

[54] BATTERY POWERED UNIT WITH BATTERY SENSOR AND RESUME PROCESSING CONTROL MEANS

[75] Inventors: Hideyuki Tayama; Noriaki Yamagishi; Shinji Yamamoto, all of Kawasaki, Japan

[73] Assignee: Fujitsu Limited, Kawasaki, Japan

[21] Appl. No.: 846,952

[22] Filed: Mar. 6, 1992

[30] Foreign Application Priority Data

Mar. 8, 1991 [JP] Japan .................................. 3-069190
Oct. 16, 1991 [JP] Japan .................................. 3-267800

[51] Int. Cl.⁵ ........................ G06F 11/00; G01R 19/00
[52] U.S. Cl. .................................. 364/483; 364/707; 371/66
[58] Field of Search .................. 364/483, 707; 371/66; 320/2, 6, 40, 48, 49, 50; 365/228, 229; 3/575

[56] References Cited

U.S. PATENT DOCUMENTS

| | | | |
|---|---|---|---|
| 4,451,742 | 5/1984 | Aswell | 371/66 |
| 4,773,032 | 9/1988 | Uehara et al. | 364/709.04 |
| 4,841,474 | 6/1989 | Zandveld et al. | 371/66 |
| 4,984,185 | 1/1991 | Saito | 364/707 |
| 4,987,317 | 1/1991 | Pournain et al. | 364/707 |
| 5,018,148 | 5/1991 | Patel et al. | 371/66 |
| 5,021,983 | 6/1991 | Nguyen et al. | 364/707 |
| 5,047,961 | 9/1991 | Simonsen | 364/550 |
| 5,117,324 | 5/1992 | Johnson, Jr. | 371/66 |

*Primary Examiner*—Thomas G. Black
*Assistant Examiner*—Tan Q. Nguyen
*Attorney, Agent, or Firm*—Staas & Halsey

[57] ABSTRACT

An apparatus driven by an output voltage of a battery when the power is ON includes a voltage detection circuit for detecting the output voltage of the battery, a judging circuit for judging whether or not a remaining capacity of the battery is greater than a predetermined value based on an output detection signal of the voltage detection circuit, and a control circuit for carrying out a resume process only if the judging circuit judges that the remaining capacity of the battery is greater than the predetermined value when the power is turned ON. The resume process returns a state of the battery powered unit to a state at a time when the power was previously turned OFF.

17 Claims, 15 Drawing Sheets

BATTERY POWERED UNIT WITH BATTERY SENSOR AND RESUME PROCESSING CONTROL MEANS

BACKGROUND OF THE INVENTION

1. Field of the Invention

The present invention generally relates to battery powered units, and more particularly to a battery powered unit such as an electronic device which is powered by a battery and a resume process is positively carried out to resume the state at the time when the power source was turned OFF.

2. Description of the Related Art

Recently, there are various kinds of battery powered units such as hand-held computers, lap-top computers and palm-top computers, and these battery powered units are popularly used. In the battery powered unit, the power is turned ON/OFF frequently to minimize the discharge of the battery and to enable the normal operation of the battery powered unit to be carried out for a long time. For this reason, it is desirable that the state at the time when the power was previously turned OFF is restored when the power is turn ON, so that the operator may continue the operation from where he previously interrupted.

A battery powered unit having a resume function is conventionally known. The resume function saves predetermined information when the power is turned OFF by carrying out a suspend operation, and restores the predetermined information saved by the suspend process when the power is turned ON by carrying out a resume process. Hence, the resume function enables the battery powered unit to be used from the state at the time when the power was previously turned OFF.

However, the conventional battery powered unit carries out the above resume process independently of the remaining capacity of the battery. For this reason, the resume process may be carried out even when the battery has virtually no remaining capacity. In this case, the voltage supplied from the battery may decrease to a voltage which cannot drive the battery powered unit while the resume process is carried out. As a result, there are problems in that the resume process cannot be carried out in a normal manner when the power is next turned ON because the memory contents within the battery powered unit may be destroyed and the resume process may only be carried out half way due to the insufficient voltage supplied from the battery.

SUMMARY OF THE INVENTION

Accordingly, it is a general object of the present invention to provide a novel and useful battery powered unit in which the problems described above are eliminated.

Another and more specific object of the present invention is to provide a battery powered unit which is driven by an output voltage of a battery when the power is ON, comprising voltage detection means for detecting the output voltage of the battery and for outputting a detection signal indicative of the detected voltage, judging means, coupled to the voltage detection means, for judging whether or not a remaining capacity of the battery is greater than a predetermined value based on the detection signal output from the voltage detection means, and control means, coupled to the judging means, for carrying out a resume process only if the judging means judges that the remaining capacity of the battery is greater than the predetermined value when the power is turned ON, where the resume process returns a state of the battery powered unit to a state at a time when the power was previously turned OFF. According to the battery powered unit of the present invention, it is possible to control the resume process depending on the state of the battery, and ensure that a positive resume process is always carried out.

Still another object of the present invention is to provide a battery powered unit which is driven by an output voltage of a battery when the power is ON, comprising voltage detection means for detecting the output voltage of the battery when the power is turned ON and for outputting a detection signal indicative of the detected voltage, judging means, coupled to the voltage detection means, for judging whether or not a remaining capacity of the battery is greater than a predetermined value based on the detection signal output from the voltage detection means, resume process means for carrying out a resume process when the power is turned ON, the resume process returning a state of the battery powered unit to a state at a time when the power was previously turned OFF, and control means, coupled to the judging means, for supplying the output voltage of the battery to drive the battery powered unit if the judging means judges that the remaining capacity of the battery is greater than the predetermined value and for prohibiting the supply of the output voltage of the battery if the judging means judges that the remaining capacity of the battery is less than or equal to the predetermined value. According to the battery powered unit of the present invention, no resume process is carried out if the remaining capacity of the battery is insufficient to drive the battery powered unit. For this reason, it is possible to prevent memory contents from being destroyed and the resume process from being incompleted due to insufficient remaining capacity of the battery.

Other objects and further features of the present invention will be apparent from the following detailed description when read in conjunction with the accompanying drawings.

DESCRIPTION OF THE PREFERRED EMBODIMENTS

Figure 1:
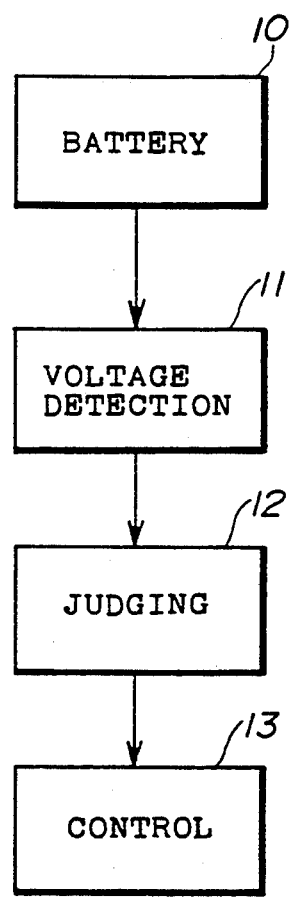
FIG. 1 is a system block diagram for explaining an operating principle of a first embodiment of a battery powered unit according to the present invention.

A description will be given of an operating principle of a first embodiment of a battery powered unit according to the present invention, by referring to FIGS. 1 and 2. FIG. 1 shows an essential part of the first embodiment for explaining the operating principle thereof, and FIG. 2 shows a flow chart for explaining the operating principle of the first embodiment.

In FIG. 1, a battery powered unit includes a battery 10, a voltage detection means 11, a judging means 12 and a control means 13 which are connected as shown. The voltage detection means 11 detects a voltage supplied from the battery 10, and the judging means 12 judges whether or not the voltage detected by the voltage detection means 11 is greater than a predetermined voltage. If the judging means 12 judges that the voltage supplied from the battery 10 is less than or equal to the predetermined voltage when the power of the battery powered unit is turned ON, the control means 13 waits until the voltage supplied from the battery 10 becomes greater than the predetermined voltage, and carries out a resume process to return the state of the battery powered unit to the state at the time when the power was previously turned OFF when the judging means 12 judges that the voltage supplied from the battery 10 is greater than the predetermined voltage.

Figure 2:
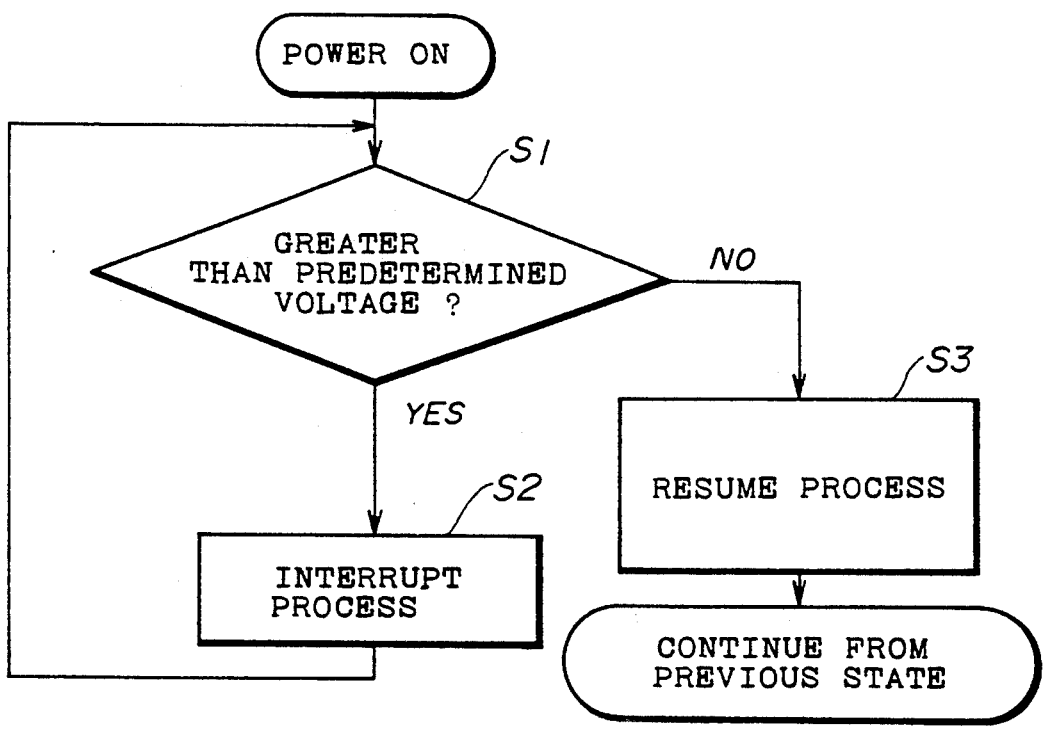
FIG. 2 is a flow chart for explaining the operating principle of the first embodiment.

As shown in FIG. 2, a step S1 decides whether or not the voltage supplied from the battery 10 is greater than the predetermined voltage when the power is turned ON. If the decision result in the step Si is YES, a step S2 interrupts the process and does not carry out the resume process, and the process returns to the step S1. On the other hand, a step S3 carries out the resume process when the decision result in the step S1 becomes NO. Hence, the predetermined information which is saved when the power is previously turned OFF is restored so that the battery powered unit is returned to the state at the time when the power was previously turned OFF. Therefore, the operator can continue the operation where he previously interrupted. The decision result in the step S1 becomes NO when the voltage supplied from the battery 10 becomes greater than the predetermined voltage due to a charging operation or the like.

According to this embodiment, the resume process is prohibited when the voltage supplied from the battery 10 is less than or equal to the predetermined voltage, and the resume process is carried out only when the voltage supplied from the battery 10 is greater than the predetermined voltage. For this reason, it is possible to prevent the voltage from the battery 10 from decreasing to a voltage which cannot drive the battery powered unit during the resume process. Hence, it is possible to prevent the memory contents from being damaged and the resume process from being discontinued at an intermediate point of the resume process due to insufficient voltage supplied from the battery 10.

Figure 3:
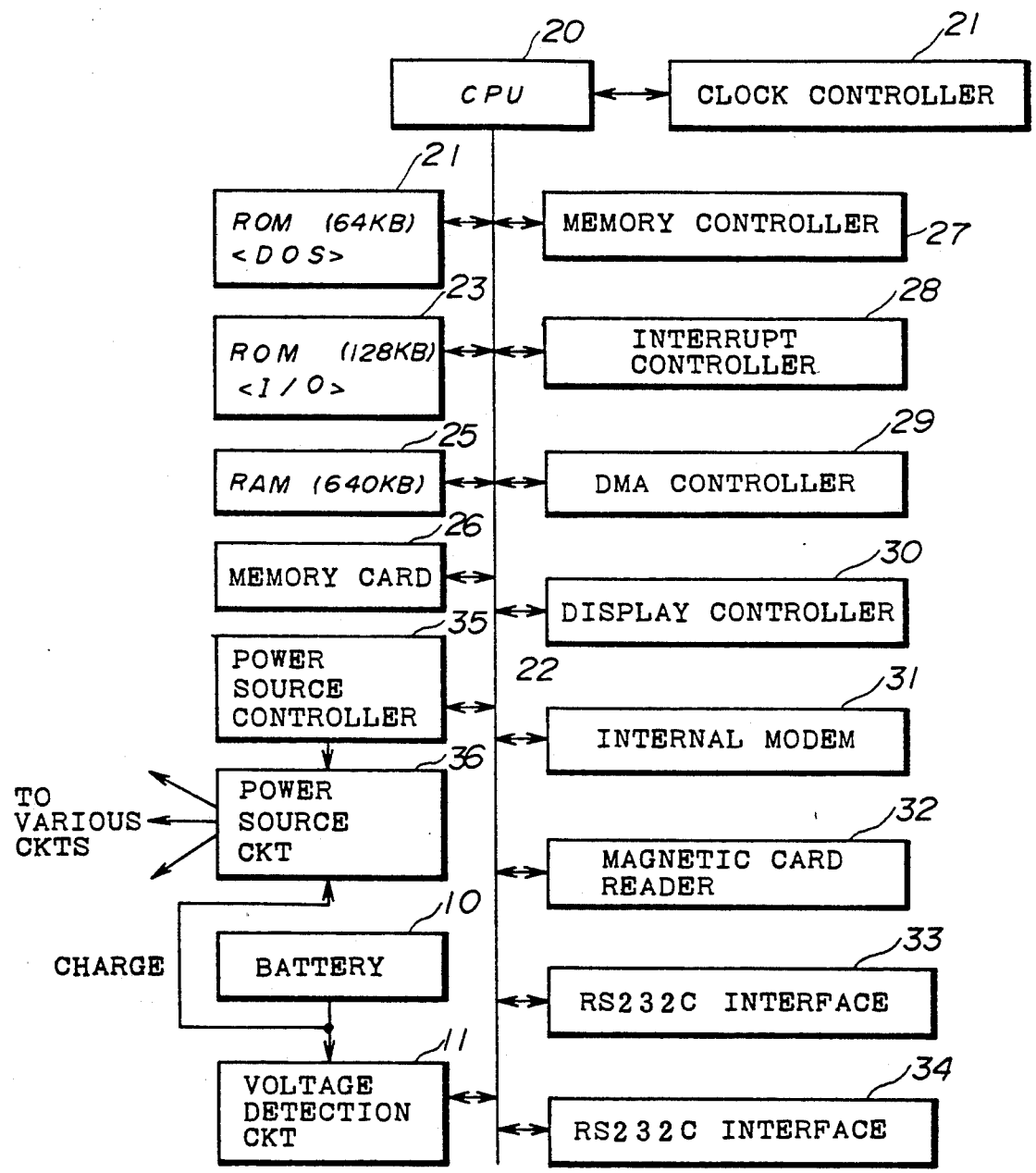
FIG. 3 is a system block diagram showing an essential part of the first embodiment.

Next, a more detailed description will be given of the first embodiment. FIG. 3 shows an essential part of the first embodiment, and in FIG. 3, those parts which are essentially the same as those corresponding parts in FIG. 1 are designated by the same reference numerals.

In FIG. 3, a voltage detection circuit 11, a central processing unit (CPU) 20, a read only memory (ROM) 23, a ROM 24, a random access memory (RAM) 25, a memory card 26, a memory controller 27, an interrupt controller 28, a direct memory access (DMA) controller 29, a display controller 30, an internal modem 31, a magnetic card reader 32, a RS232C interface 33, a RS232C interface 34 and a power source controller 35 are coupled via a system bus 22. A battery 10 is connected to the voltage detection circuit 11 and to a power source circuit 36. A clock controller 21 is coupled to the CPU 20.

The CPU 20 controls the operation of the entire battery powered unit, and the clock controller 21 controls clock signals which are supplied to the CPU 20. More particularly, the clock controller 21 selectively supplies a high-speed clock signal or a low-speed clock signal to the CPU 20 depending on a control signal which is received from the CPU 20. Hence, the CPU 20 can operate at a high speed based on the high-speed clock signal or at a low speed based on the low-speed clock signal. The operation of the battery powered unit is controlled by exchanging data between the CPU 20 and the various input/output devices such as the memories and the controllers via the system bus 22.

Figure 4:
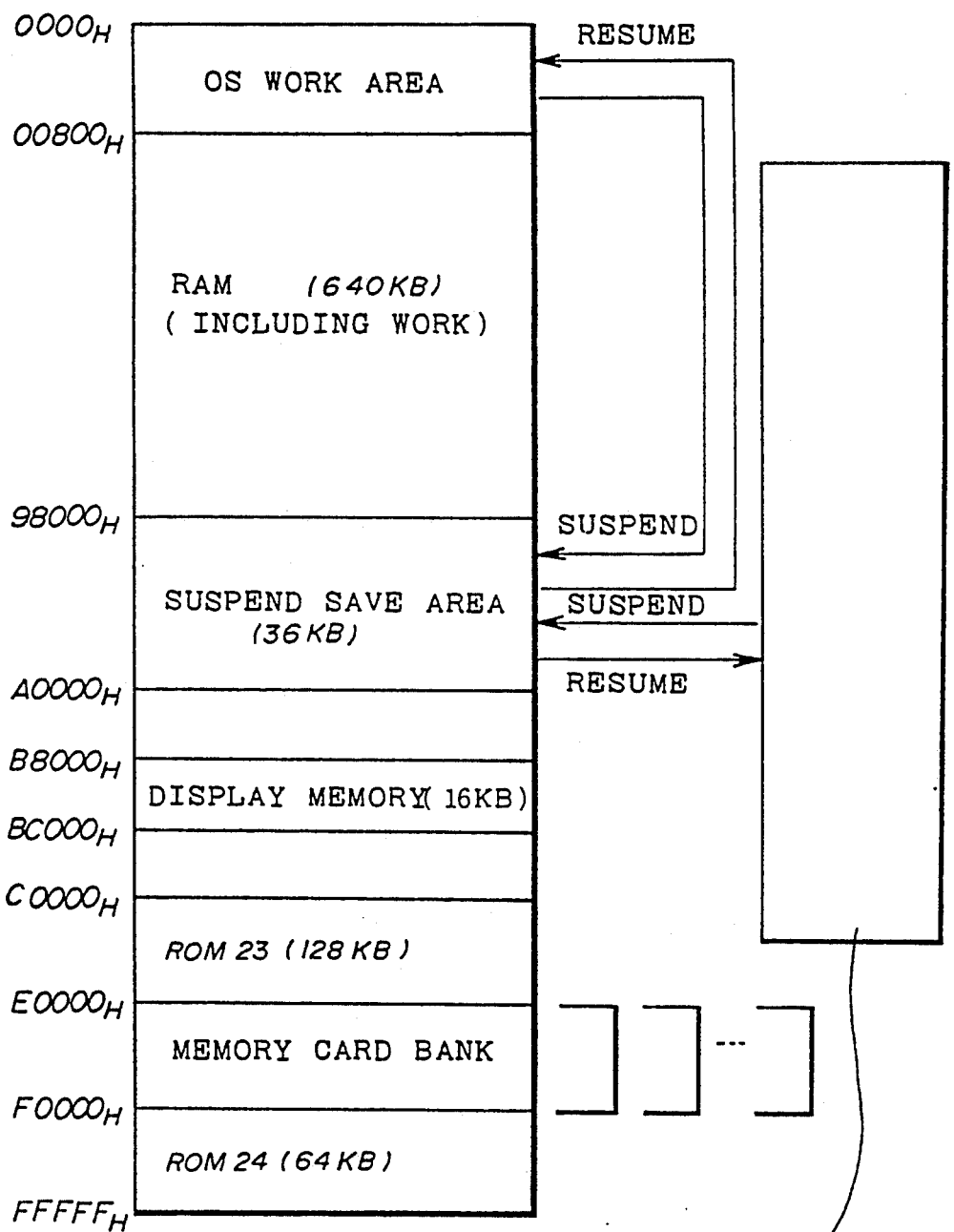
FIG. 4 is a diagram for explaining an address space of each memory used in the first embodiment.

FIG. 4 shows the allocation of the ROMs 23 and 24, the RAM 25, the memory card 26 and a display memory (not shown) in the address space. The ROM 23 stores input control programs (I/O), while the ROM 24 stores the operating system (DOS). The RAM 25 is used as a work area for the OS, a suspend save area, a display memory, and other work areas. This RAM 25 is backed up by a battery which is not shown in FIG. 3. The memory card 26 is an IC card, for example, and is used as a memory by inserting the memory card 26 into the battery powered unit. This memory card 26 may have one of various memory capacities, and is used in a predetermined address space ($E0000_H$ to $EFFFF_H$), for example. The predetermined address space of the memory card 26 has a bank structure, and each individual memory card 26 is used as a bank memory.

Not all elements of the battery powered unit shown in FIG. 3 are directly related to the operation of this embodiment. For this reason, only a brief description will be given of the elements which are not directly related to the operation of this embodiment.

The memory controller 27 controls the write/read of data with respect to the ROMs 23 and 24, the RAM 25 and the memory card 26. The interrupt controller 28 controls interrupts with respect to the CPU 20. The DMA controller 29 controls the data transfer between the memory and other I/O devices.

The display controller 30 controls the display of a display device which is not shown in FIG. 3. The internal modem 31 modulates or demodulates signals when making a communication with the outside. The magnetic card reader 32 reads data from a magnetic stripe of a card, for example. The RS232C interfaces 33 and 34 control the exchange of data between the battery powered unit and an external unit (not shown).

The power source controller 35 controls the power source circuit 36 and specifies one of a plurality of kinds of voltages which are generated from the power source circuit 36. Hence, only the necessary kind of voltage is output as the power source voltage, so as to prevent unnecessary discharge of the battery 10.

The power source circuit 36 receives the voltage supplied from the battery 10 and generates the voltage which is specified from the power source controller 35 and is required to operate the battery powered unit. The output voltage of the power source circuit 36 is supplied to various circuits of the battery powered unit.

For example, the battery 10 is a chargeable nickel-cadmium battery, a lithium battery and the like. The output voltage of the battery 10 is supplied to the power source circuit 36 and to the voltage detection circuit 11. The voltage detection circuit 11 detects the output voltage of the battery 10, and a detection signal output from the voltage detection circuit 11 is supplied to the CPU 20 via the system bus 22. The details of the voltage detection circuit 11 will be given later.

The suspend save area ($98000_H$ to $9FFFF_H$) shown in FIG. 4 which is directly related to the operation of this embodiment is provided in the RAM 25. This suspend save area is used to save predetermined data when carrying out the suspend process. In this embodiment, the contents of the OS work area, the contents of internal registers and the like of the CPU 20, the display controller 30, the memory controller 27, the interrupt controller 28 and other peripheral LSIs are saved in the suspend save area (memory area) which is backed up by the battery when this suspend process is carried out. The suspend process will be described in more detail later.

Each data saved in the suspend save area is returned to the original memory area, the original internal register and the like when the power is turned ON. This process of returning the saved data back to the original location is called the resume process. A more detailed description of this resume process will also be described later.

Figure 5:
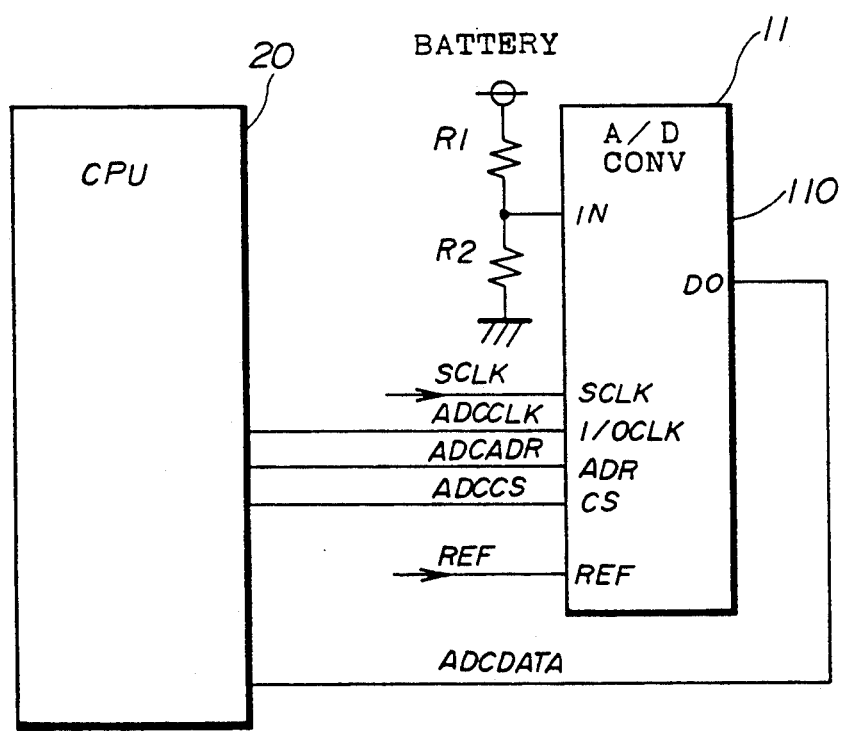
FIG. 5 is a system block diagram showing an embodiment of a voltage detection circuit used in the first embodiment.

FIG. 5 shows an embodiment of the voltage detection circuit 11 shown in FIG. 3. The voltage detection circuit 11 shown in FIG. 3 includes resistors R1 and R2, and an analog-to-digital (A/D) converter 110 which are connected as shown. The A/D converter 110 has a plurality of analog signal input terminals, although only one input terminal IN is shown in FIG. 5. A voltage which is obtained by dividing the output voltage of the battery 10 by the resistors R1 and R2 is supplied to this input terminal IN. An A/D converter clock signal ADCCLK, an a/D converter address ADCADR and an A/D converter chip select signal ADCCS from the CPU 20 are also supplied to the A/D converter 110.

The A/D converter chip select signal ADCCS enables the A/D converter 110. The A/D converter address ADCADR specifies one of the plurality of input terminals of the A/D converter 110 to be selected. In addition, the A/D converter clock ADCCLK determines the timing with which the A/D converter address ADCADR is entered into the A/D converter 110 and the timing with which the data is to be output from an output terminal DO of the A/D converter 110.

The A/D converter 110 also receives a clock signal SCLK which is generated from a clock generating circuit (not shown). This clock signal SCLK operates an internal circuit of the A/D converter 110. A reference voltage REF which is generated from a constant voltage generating circuit (not shown) is also supplied to the A/D converter 110. The A/D converter 110 converts the input voltage to a digital value by taking the reference voltage REF as a reference. A known circuit which receives the voltage from the battery 10 and generates a constant voltage which is lower than the voltage from the battery 10 may be used as the constant voltage generating circuit.

The digital value output from the A/D converter 110 is output from the output terminal DO one bit at a time in serial in synchronism with the A/C converter clock ADCCLK, and is supplied to the CPU 20. The CPU recognizes the voltage supplied from the battery 10 based on the output digital value of the A/D converter 110, and decides whether or not this voltage is greater than the predetermined voltage as described above in conjunction with the step S1 shown in FIG. 2.

Figure 6:
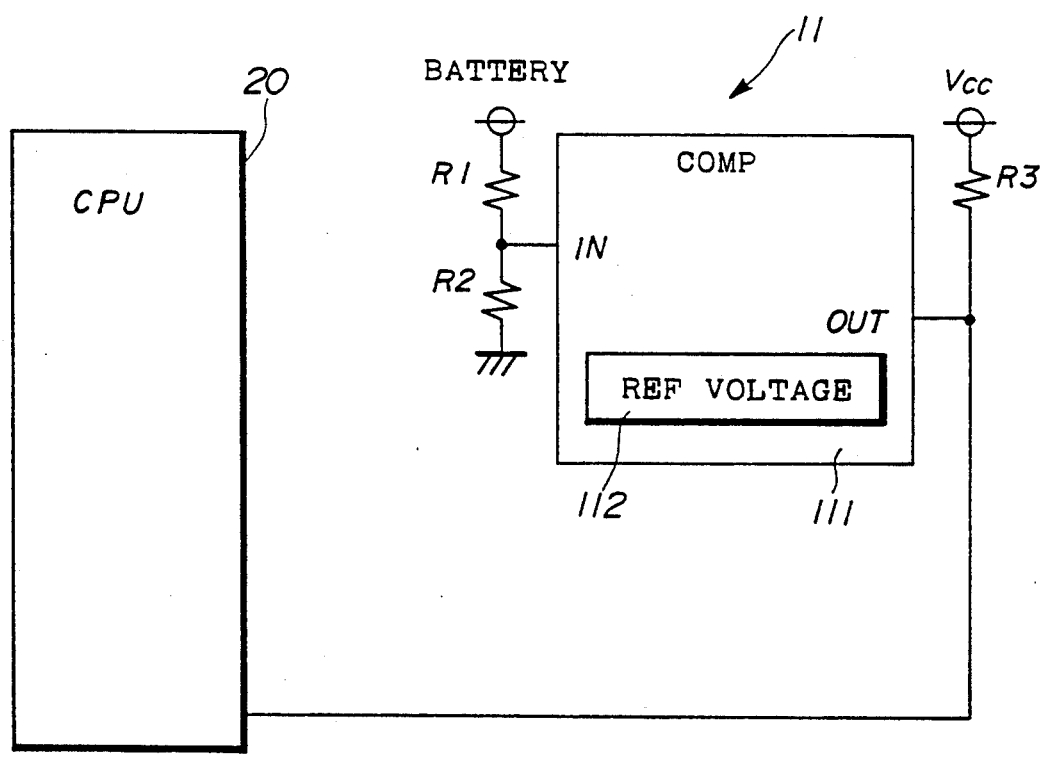
FIG. 6 is a system block diagram showing another embodiment of the voltage detection circuit used in the first embodiment.

FIG. 6 shows another embodiment of the voltage detection circuit 11. This voltage detection circuit 11 shown in FIG. 6 includes resistors R1, R2 and R3, and a comparator 111 which are connected as shown. The comparator 111 has one analog signal input terminal IN which receives a voltage which is obtained by dividing the output voltage of the battery 10 using the resistors R1 and R2.

The comparator 111 includes a reference voltage generating circuit 112 which receives a power source voltage Vcc from the power source circuit 36 and generates a reference voltage which is to be compared with the voltage input to the input terminal IN. An output signal of the comparator 111, indicative of the result of the voltage comparison, is output from an output terminal OUT and is supplied to the CPU 20. For example, the output signal of the comparator Ill has a value "0" or "1" depending on the result of the voltage comparison.

The CPU recognizes the voltage supplied from the battery 10 based on the output signal of the comparator 111, and decides whether or not this voltage is greater than the predetermined voltage (reference voltage) as described above in conjunction with the step S1 shown in FIG. 2.

Next, a description will be given of the operation of this embodiment of the battery powered unit described above.

Figure 7:
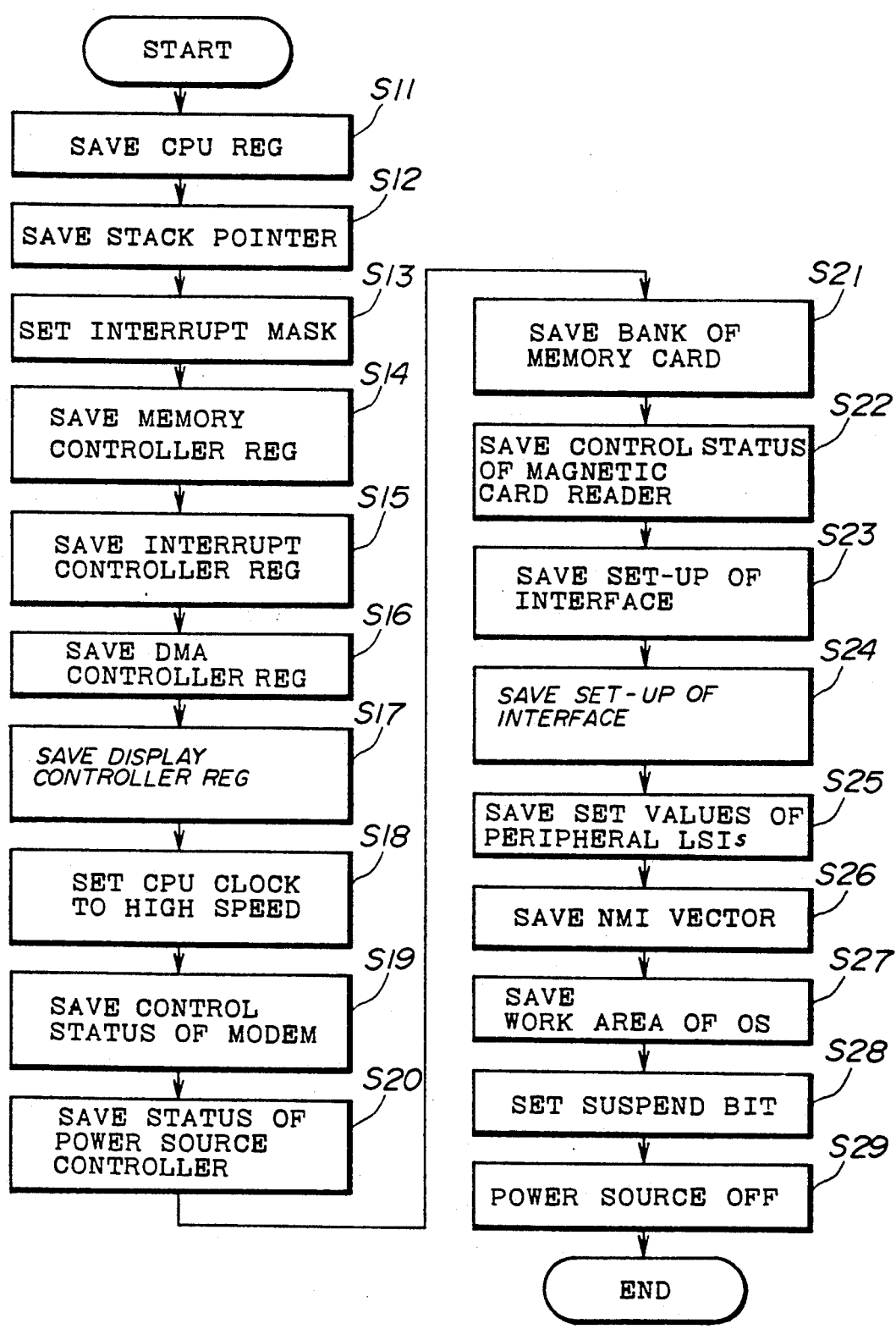
FIG. 7 is a flow chart for explaining a suspend process of the first embodiment.

A suspend process shown in FIG. 7 is carried out when the power of the battery powered unit is turned OFF. First, a step S11 saves the content of the register of the CPU 20. In other words, the content of a predetermined internal register of the CPU 20 is stored in the suspend save area of the RAM 25. Then, a step S12 saves a stack pointer which is provided in the RAM 25 and points a stack which is presently used. A step S13 sets an interrupt mask which prohibits an interrupt so as to enable prompt execution of processes which follow.

A step S14 saves the content of the internal register of the memory controller 27, a step S15 saves the content of the internal register of the interrupt controller 28, a step S16 saves the content of the internal register of the DMA controller 29, and a step S17 saves the content of the internal register of the display controller 30.

Next, a step S18 controls the clock controller 21 to set the clock of the CPU 20 to the high-speed clock. Hence, the CPU 20 thereafter operates based on this high-speed clock.

A step S19 saves a control status of the internal modem 31, a step S20 saves a status of the power source controller 35, and a step S21 saves a bank of the memory card 26. That is, the step S21 saves a number of the bank which is presently selected. A step S22 saves a control status of the magnetic card reader 32. In addition, a step S23 saves a set-up information of the RS232C interface 33, and a step S24 saves a set-up information of the RS232C interface 34. For example, the set-up information includes speed information, data word length, existence of parity bit and the like.

A step S25 saves set values of the peripheral LSIs. In other words, internal data of the peripheral LSIs which are necessary to realize the various functions of the battery powered unit are saved. Then, a step S26 saves an NMI vector which is the information indicating an entry address of a processing routine of an interrupt prohibit impossible interrupt (NMI). A step S27 saves the content of the work area of the OS within the RAM 25. A step S28 sets a suspend bit which indicates whether or not the suspend process is carried out. A reference is made to this suspend bit when carrying out the resume process.

The power is turned OFF in a step S29 when the series of processes described above end. In other words, by controlling the power source controller 35, the output of the power source circuit 36 is turned OFF to cut off the supply of the power source voltage to the various parts of the battery powered unit.

Figure 8:
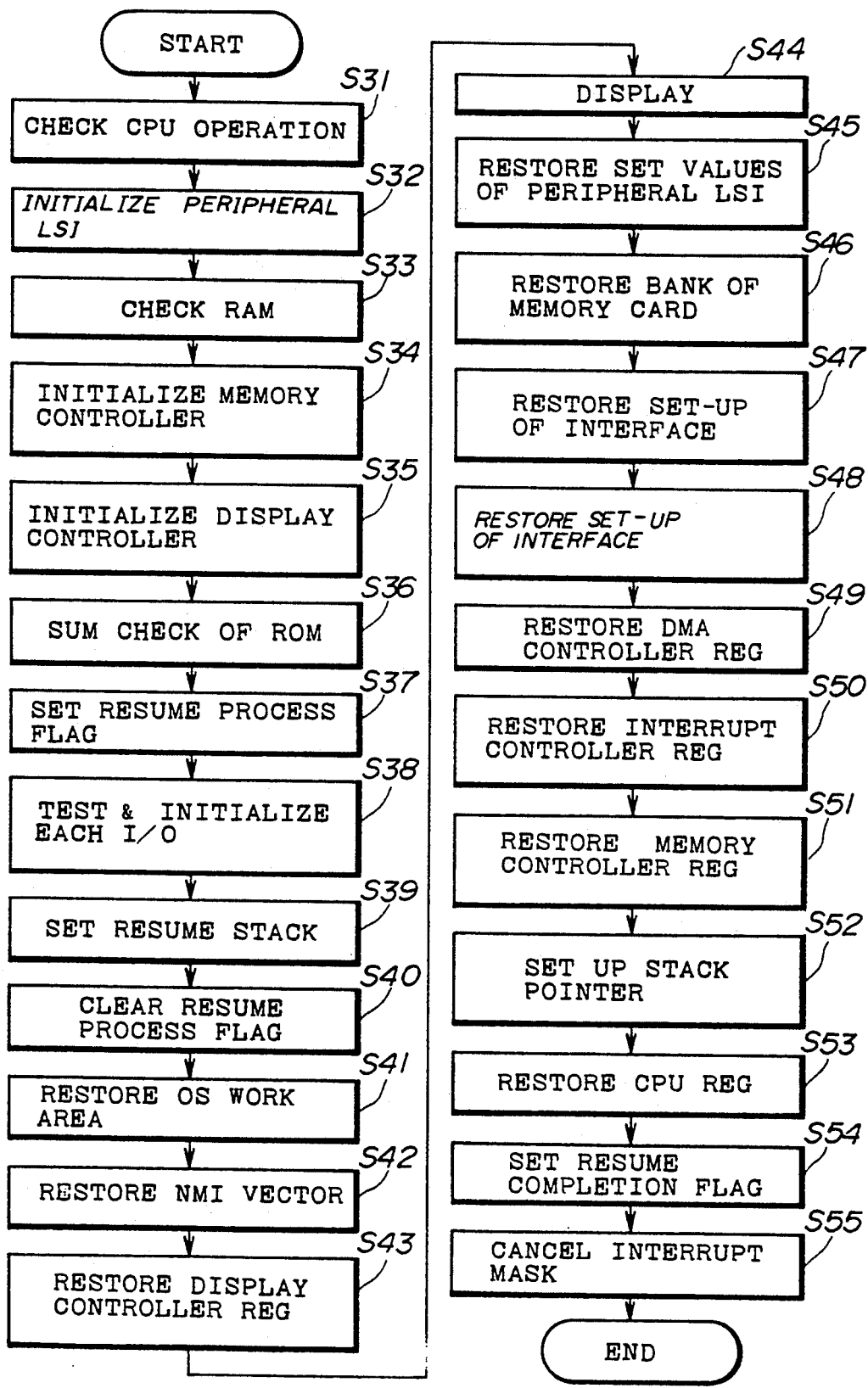
FIG. 8 is a flow chart for explaining a resume process of the first embodiment.

A resume process shown in FIG. 8 is carried out when the power of the battery powered unit is turned ON. First, various initial check operations are carried out to check the proper state of the battery powered unit before restoring the data which are saved by the suspend process.

A step S31 checks the operation of the CPU 20. A step S32 initializes the peripheral LSIs so as to realize the various functions of the peripheral LSIs. Then, a step S33 checks the RAM 25 to determine whether or not reading/writing of data is possible using this RAM 25. A step S34 initializes the memory controller 27, and a step S35 initializes the display controller 30. As a result, it becomes possible to read/write data to/from the RAM 25 and carry out a display operation using the display device.

Next, a step S36 makes a sum check operation with respect to the ROMs 23 and 24. All of the data stored in the ROMs 23 and 24 are added, and the sum check operation determines whether or not the sum becomes the same as a predetermined data. Hence, the validity of the ROMs 23 and 24 is confirmed when the sum matches the predetermined data.

A step S37 sets a resume process flag which is used to recognize that following steps S38 and S39 are being processed. In other words, when an interrupt is generated in a state where the resume process flag is set, a special process is carried out. Thereafter, a step S38 tests and initializes each I/O device other than the I/O devices described above. A step S39 sets a resume stack to form the stack which is used to carry out the resume process. A step S40 clears the resume process flag.

The initial check operations are completed by the processes described above, and a process of restoring the data which are saved by the suspend process is started. Although not shown in FIG. 8, if the suspend process is not carried out when the power of the battery powered unit is turned OFF and the suspend bit is not set, the restore process which will be described hereafter will not be carried out. In this case, the process branches to a step S55 to cancel an interrupt mask and end the resume process.

On the other hand, when restoring the saved data, the restoration is carried out in a reverse sequence to that at the time when the data were saved by the suspend process. In other words, a step S41 restores the work area of the OS, a step S42 restores the NMI vector, a step S43 restores the content of the internal register of the display controller 30, and a step S44 displays predetermined data on the display device.

Then, a step S45 restores the set values of the peripheral LSIs, a step S46 restores the bank of the memory card 26, a step S47 restores the set-up information of the RS232C interface 33, a step S48 restores the set-up information of the RS232C interface 34, a step S49 restores the content of the internal register of the DMA controller 29, a step S50 restores the content of the internal register of the interrupt controller 28, a step S51 restores the content of the internal register of the memory controller 27, a step S52 sets up the stack pointer, and a step S53 restores the content of the internal register of the CPU 20. In addition, a step S54 sets a resume completion flag, the step S55 cancels the interrupt mask and the resume process ends.

When the resume process described above is completed, the control of the CPU 20 is returned to the control which was being carried out at the time when the power of the battery powered unit was turned OFF, so that the operation may be continued from where it was previously interrupted by the turning OFF of the power.

Therefore, according to this embodiment, the resume process is prohibited and the battery powered unit assumes a standby state if the voltage supplied from the battery 10 is less than or equal to the predetermined voltage, and the resume process is enabled only when the voltage supplied from the battery 10 becomes greater than the predetermined voltage. For this reason, it is possible to prevent the battery voltage from decreasing to a voltage which is insufficient to drive the battery powered unit while the resume process is being carried out. In other words, it is possible to prevent the memory contents from becoming destroyed and the resume process from being incompleted due to the insufficient voltage supplied from the battery. This embodiment ensures that the resume process is always carried out positively.

Figure 9:
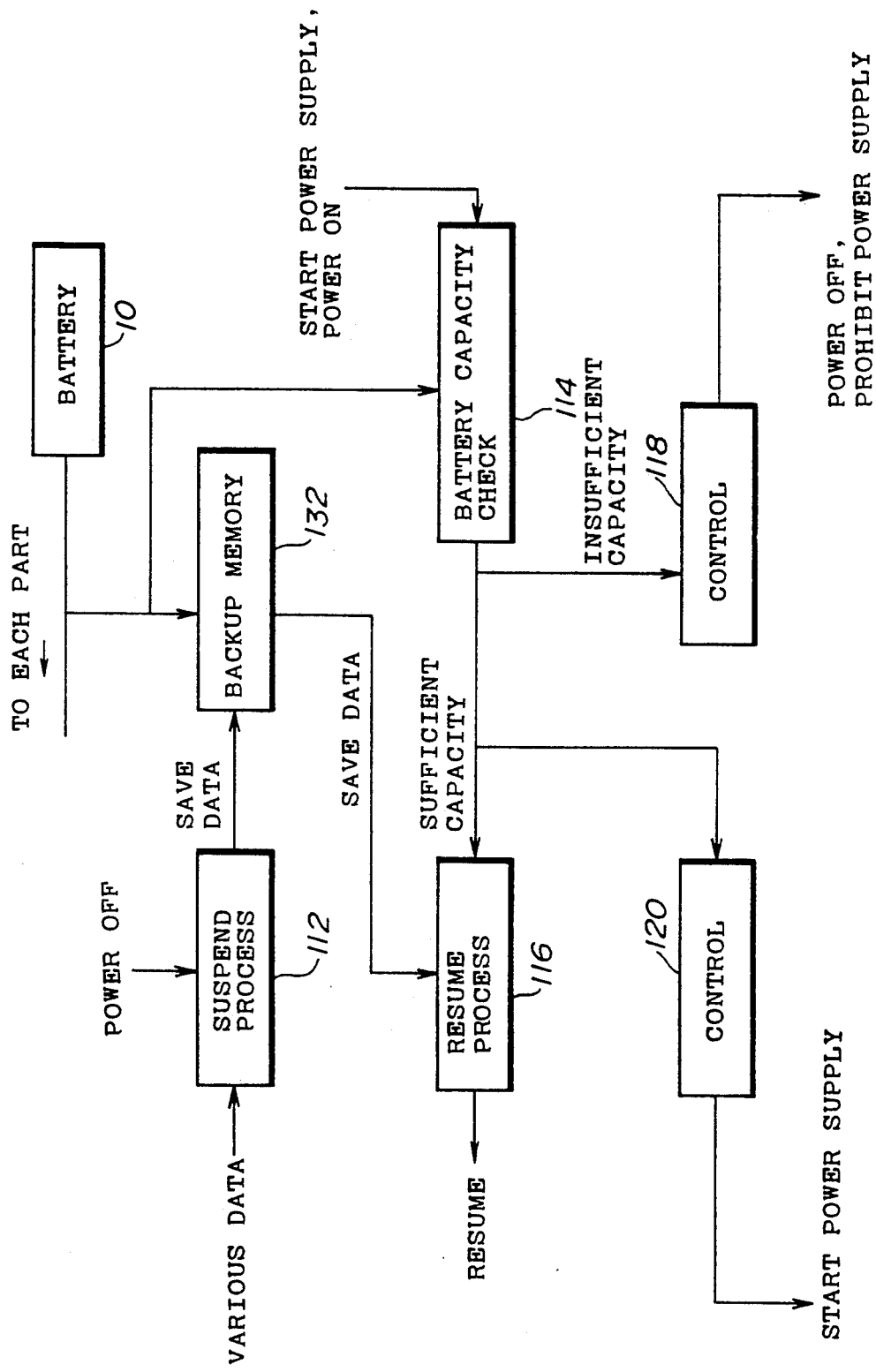
FIG. 9 is a system block diagram for explaining an operating principle of second and third embodiments of the battery powered unit according to the present invention.

Next, a description will be given of an operating principle of second and third embodiments of the battery powered unit according to the present invention, by referring to FIG. 9.

According to the second embodiment, the voltage from a battery 10 is supplied to various parts of the battery powered unit, and a suspend process means 112 carries out the suspend process when the power of the battery powered unit is turned OFF. A battery capacity check means 114 checks the remaining capacity of the battery 10 when the power of the battery powered unit is turned ON. A resume process means 116 carries out the resume process when it is confirmed that the remaining capacity of the battery 10 is sufficient to drive the battery powered unit. A control means 118 immediately cuts off the power supply when it is confirmed that the remaining capacity of the battery 10 is insufficient to drive the battery powered unit.

Hence, according to the second embodiment, the resume process is prevented from being started when the remaining capacity of the battery 10 is insufficient to drive the battery powered unit because the power supply is cut off.

On the other hand, according to the third embodiment, the voltage from the battery 10 is supplied to various parts of the battery powered unit, and the suspend process means 112 carries out the suspend process when the power of the battery powered unit is turned OFF. The battery capacity check means 114 checks the remaining capacity of the battery 10 when the power of the battery powered unit is turned ON. The resume process means 116 carries out the resume process when the supply of power starts. A control means 120 carries out a control to start the supply of power when it is confirmed that the remaining capacity of the battery 10 is sufficient to drive the battery powered unit, and the control means 18 carries out a control to prohibit the supply of power when it is confirmed that the remaining capacity of the battery 10 is insufficient to drive the battery powered unit.

Hence, according to the third embodiment, the resume process is prevented from being started when the remaining capacity of the battery 10 is insufficient to drive the battery powered unit because the supply of power is prohibited.

Figure 10:
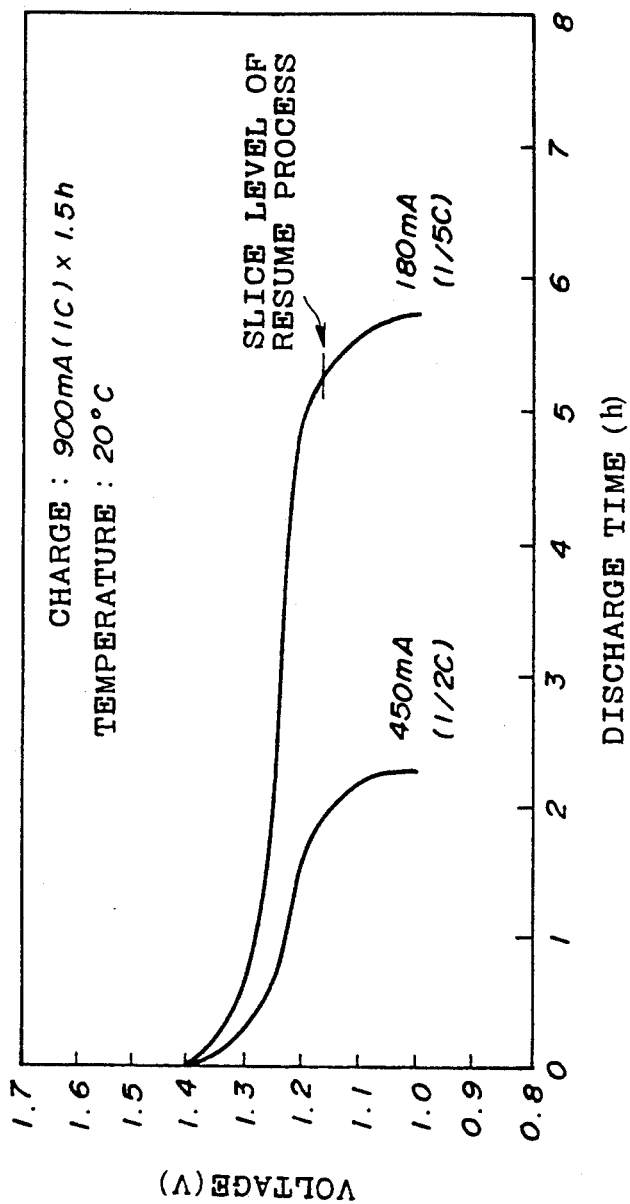
FIG. 10 shows a discharge characteristic of a nickel-cadmium battery.
Figure 11:
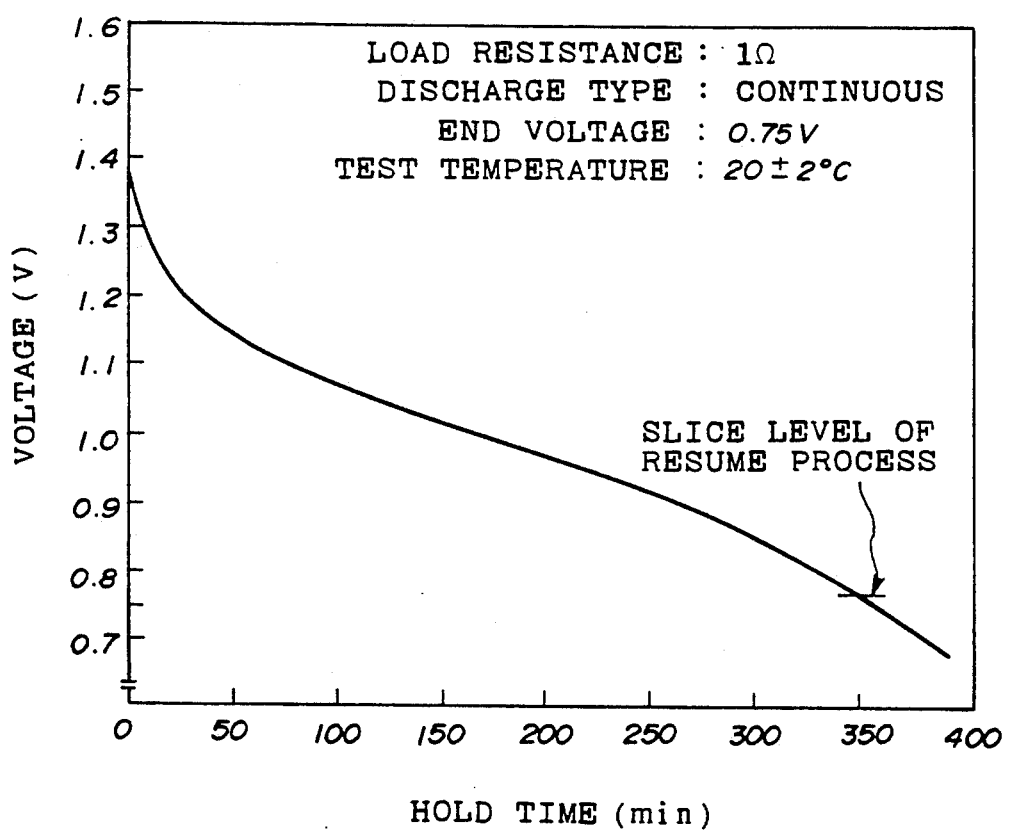
FIG. 11 shows a discharge characteristic of an alkaline battery.

The process time of the resume process is constant. Hence, it is possible to determine whether or not to carry out the resume process based on the remaining capacity (or voltage) of the battery 10, if the discharge characteristic of the battery 10 is known. FIG. 10 shows a discharge characteristic of a nickel-cadmium battery which may be used as the battery 10, and FIG. 11 shows a discharge characteristic of an alkaline battery which may be used as the battery 10.

Figure 12:
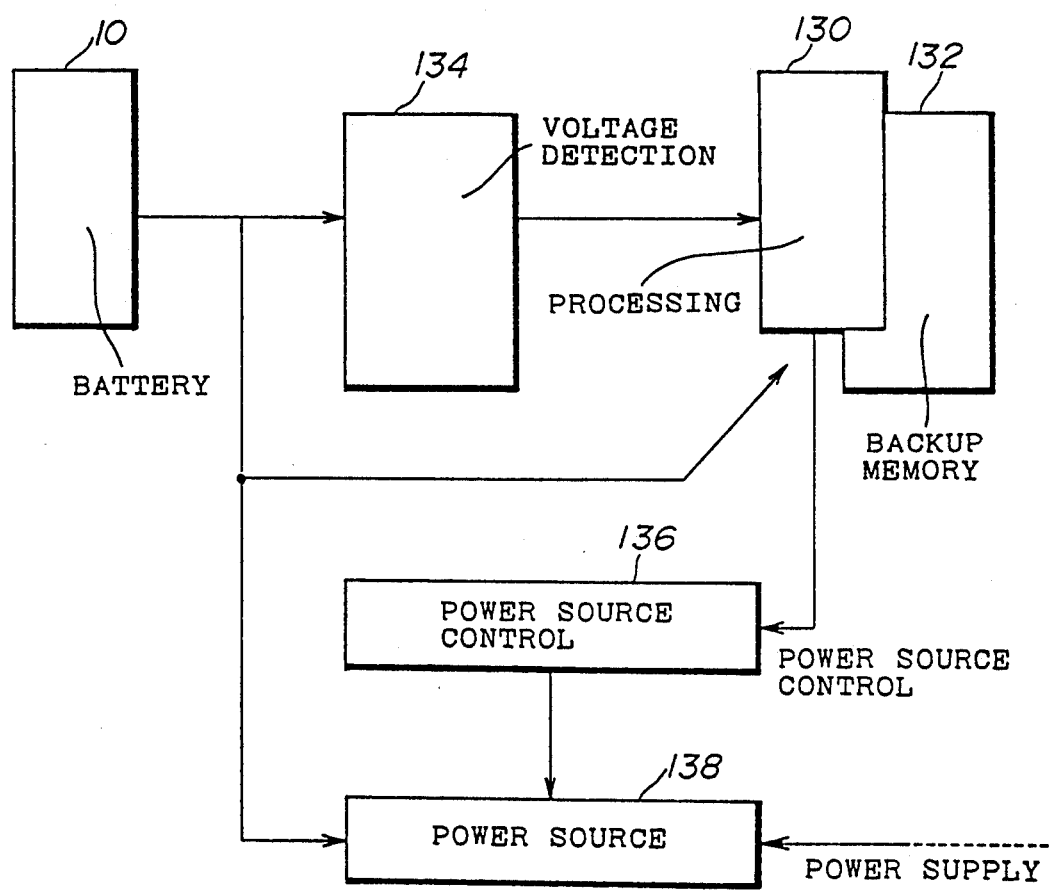
FIG. 12 is a system block diagram showing an essential part of the second embodiment.

Next, a more detailed description will be given of the second embodiment, by referring to FIGS. 12 and 13. FIG. 12 shows an essential part of the second embodiment, and FIG. 13 is a flow chart for explaining the operation of the second embodiment.

In FIG. 12, the battery powered unit includes the battery 10, a processing circuit 130, a backup memory 132, a voltage detection circuit 134, a power source control circuit 136 and a power source circuit 138 which are connected as shown. The battery 10 supplies the output voltage thereof to various parts of the battery powered unit via the power source circuit 138. This power source circuit 138 is controlled by the power source control circuit 136 which is controlled by the processing circuit 130. The processing circuit 130 controls the power source control circuit 136 based on the output detection signal of the voltage detection circuit 134. In this embodiment, the voltage detection circuit 134 has the construction shown in FIG. 5 described above.

Figure 13:
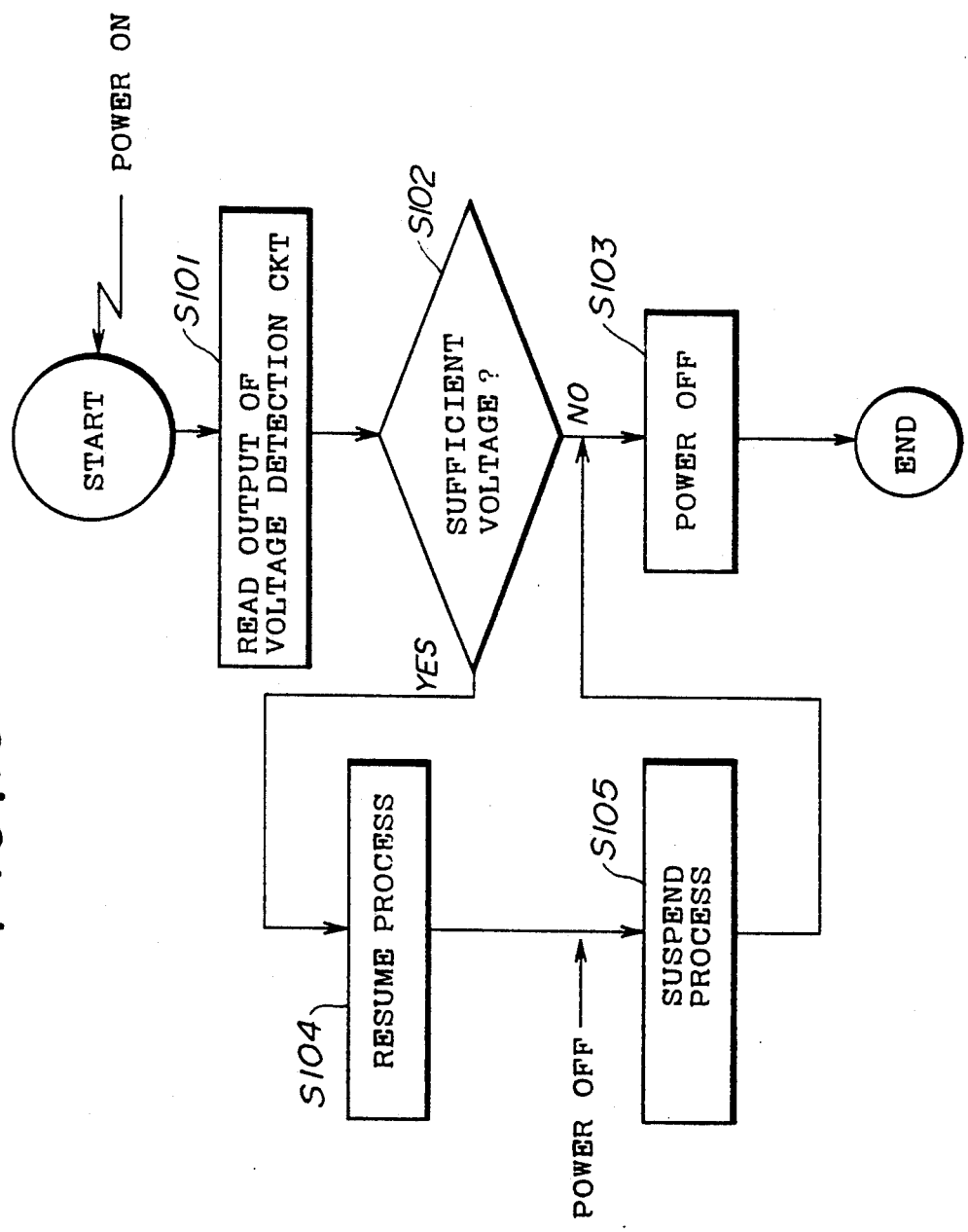
FIG. 13 is a flow chart for explaining an operation of the second embodiment.

When the power of the battery powered unit is turned ON, the processing circuit 130 carries out the process show in FIG. 13. A step S101 reads the output detection signal of the voltage detection circuit 134, and a step S102 decides whether or not the voltage supplied from the battery 10 is sufficient to drive the battery powered unit. If the decision result in the step S102 is NO, a step S103 cut off the supply of power and the process ends.

On the other hand, if the decision result in the step S102 is YES, a step S104 carries out the resume process. For example, the processing circuit 130 carries out the resume process described above in conjunction with FIG. 8. Then, a step S105 carries out the suspend process. For example, the processing circuit 130 carries out the suspend process described above in conjunction with FIG. 7. The step S103 is carried out after the step S105. The process starts from the step S105 when the power of the battery powered unit is turned OFF.

According to this embodiment, when the power of the battery powered unit is turned ON, the operation can be resumed from the state at the time when the power was previously turned OFF. In addition, the processing circuit 130 supplies a control instruction to the power source control circuit 136 when the processing circuit 130 determines from the output detection signal of the voltage detection circuit 134 that the voltage supplied from the battery 10 is insufficient to drive the battery powered unit. In this case, the power source control circuit 136 controls the power source circuit 138 based on the control instruction so that the supply of power, that is, the voltage supply, to the various parts of the battery powered unit is cut off immediately. As a result, the resume process is prohibited, and it is possible to prevent the memory contents from being destroyed and the resume process from being incompleted.

Figure 14:
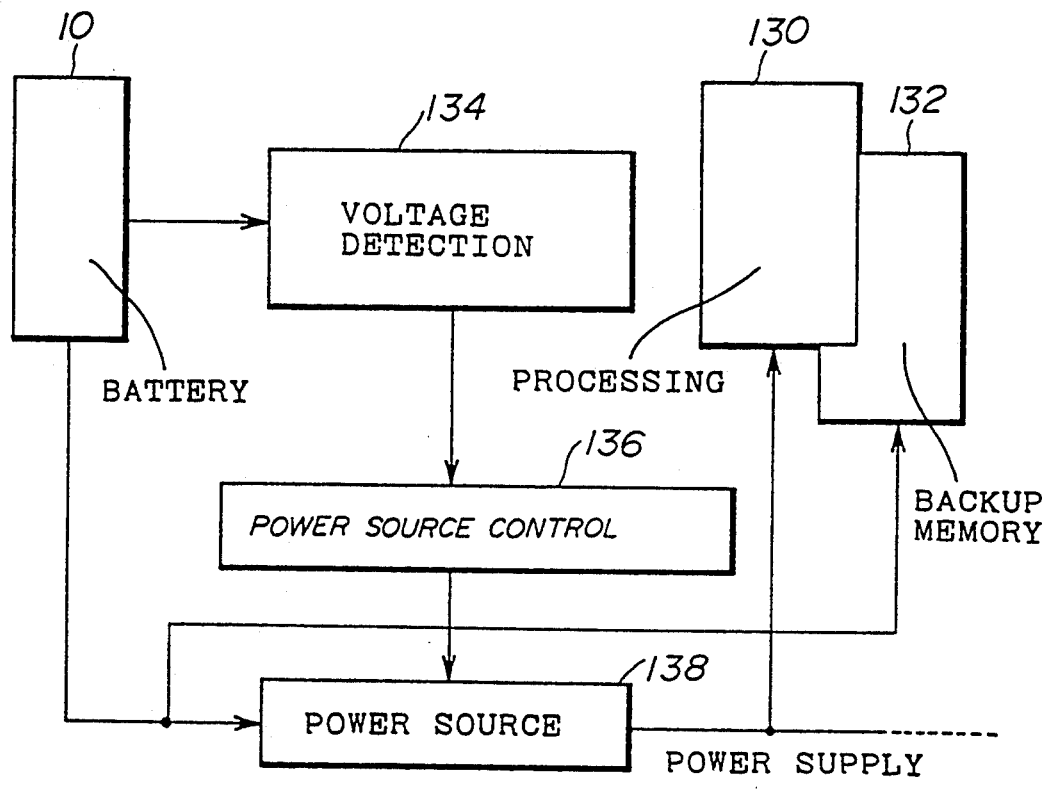
FIG. 14 is a system block diagram showing an essential part of the third embodiment.

Next, a more detailed description will be given of the third embodiment, by referring to FIG. 14. FIG. 14 shows an essential part of the third embodiment. In FIG. 14, those parts which are basically the same as those corresponding parts in FIG. 12 are designated by the same reference numerals, and a description thereof will be omitted.

In this embodiment, the voltage detection circuit 134 has the construction shown in FIG. 6 described above. When the power source control circuit 136 determines that the remaining capacity of the battery 10 is sufficient to drive the battery powered unit based on the output detection signal of the voltage detection circuit 134, the power source control circuit 136 controls the power source circuit 138 to supply the power to the various parts of the battery powered unit including the processing circuit 130. Hence, the resume process is normally carried out by the processing circuit 130, and the operation can be continued from the state at the time when the power was previously turned OFF.

On the other hand, if the power source control circuit 136 determines that the remaining capacity of the battery 10 is insufficient to drive the battery powered unit based on the output detection signal of the voltage detection circuit 134, the power source control circuit 136 controls the power source circuit 138 to prohibit the supply of power to the various parts of the battery powered unit. As a result, no resume process is carried out, and it is possible to prevent the memory contents from being destroyed and the resume process from being incompleted due to the insufficient remaining capacity of the battery 10.

Figure 15:
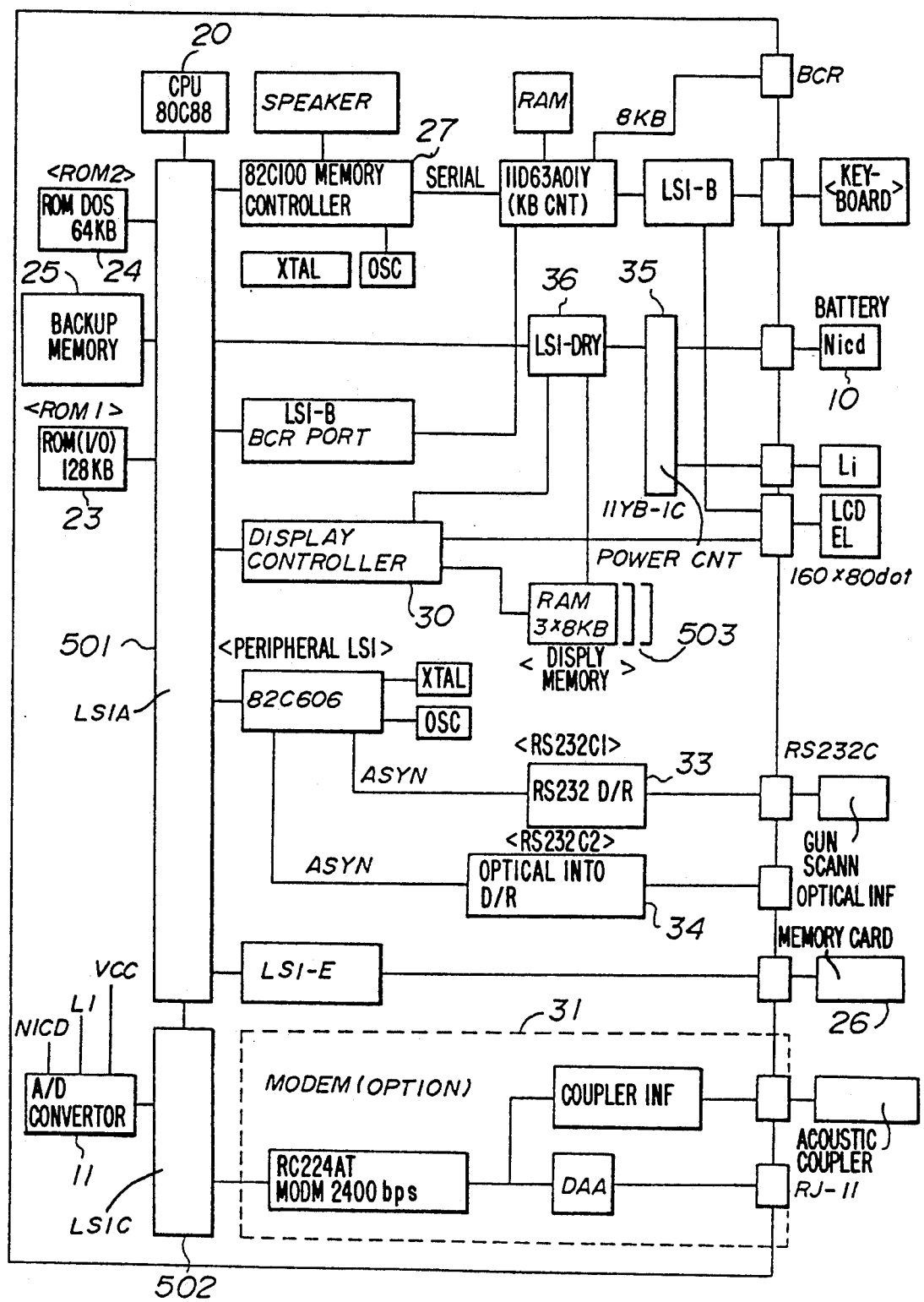
FIG. 15 is a system block diagram showing an essential part of a battery powered unit to which the second and third embodiments may be applied.

FIG. 15 shows an essential part of the battery powered unit to which the second and third embodiments may be applied. This unit shown in FIG. 15 is a communication interface unit "AcuTote 3000" manufactured by Fujitsu Systems of America, for example. An example of this type of unit is disclosed in a U.S. Pat. No. 4,773,032. In FIG. 15, those parts which are basically the same as those corresponding parts in FIG. 3 are designated by the same reference numerals, and a description thereof will be omitted.

In FIG. 15, the CPU 20 corresponds to the processing circuit 130 shown in FIGS. 12 and 14. The RAM 25 corresponds to the backup memory 132 shown in FIGS. 12 and 14. The voltage detection circuit 11 corresponds to the voltage detection circuit 134 shown in FIGS. 12 and 14. The power source controller 35 corresponds to the power source control circuit 136 shown in FIGS. 12 and 14, and the power source circuit 36 corresponds to the power source circuit 138 shown in FIGS. 12 and 14. LSI gate arrays 501 and 502 make the necessary connections and the necessary logic operations.

For example, the allocation of the ROMs 23 and 24, the RAM 25, the memory card 26 and a display memory 503 in the address space may be the same as that shown in FIG. 4 described above.

Further, the present invention is not limited to these embodiments, but various variations and modifications may be made without departing from the scope of the present invention.

What is claimed is:

1. A battery powered unit which is driven by an output voltage of a battery when the power is ON, said battery powered unit comprising:
   voltage detection means for detecting the output voltage of the battery and for outputting a detection signal indicative of the detected voltage;
   judging means, coupled to said voltage detection means, for judging whether or not a remaining capacity of the battery is greater than a predetermined value based on the detection signal output from said voltage detection means; and
   control means, coupled to said judging means, for carrying out a resume process only if said judging means judges that the remaining capacity of the battery is greater than the predetermined value when the power is turned ON,
   said resume process returning a state of the battery powered unit to a state at a time when the power was previously turned OFF.

2. The battery powered unit as claimed in claim 1, wherein said voltage detection means includes an analog-to-digital converter which converts the output voltage of the battery into a digital value and outputs the digital value as the detection signal.

3. The battery powered unit as claimed in claim 1, wherein said voltage detection means includes a comparator which compares the output voltage of the battery with a reference voltage and outputs a signal indicative of a result of the comparison as the detection signal.

4. The battery powered unit as claimed in claim 1, wherein said judging means judges whether or not the remaining capacity of the battery is greater than the predetermined value by judging whether or not the voltage detected by said voltage detection means is greater than a predetermined voltage.

5. The battery powered unit as claimed in claim 1, wherein said control means retains the battery powered unit in a standby state if said judging means judges that the remaining capacity of the battery is less than or equal to the predetermined value when the power is turned ON.

6. The battery powered unit as claimed in claim 1, wherein said control means includes suspend process means for carrying out a suspend process when the power of the battery powered unit is turned OFF, said suspend process storing predetermined information at the time when the power is turned OFF.

7. The battery powered unit as claimed in claim 6, wherein said control means reads and restores the predetermined information during the resume process.

8. The battery powered unit as claimed in claim 7, wherein the predetermined information is related to the state of the battery powered unit.

9. The battery powered unit as claimed in claim 1, wherein said voltage detection means detects the output voltage of the battery when the power of the battery powered unit is turned ON, and said control means includes means for immediately cutting off the power if said judging means judges that the remaining capacity of the battery is less than or equal to the predetermined value.

10. The battery powered unit which is driven by an output voltage of a battery when the power is ON, said battery powered unit comprising:
    voltage detection means for detecting the output voltage of the battery when the power is turned ON and for outputting a detection signal indicative of the detected voltage;
    judging means, coupled to said voltage detection means, for judging whether or not a remaining capacity of the battery is greater than a predetermined value based on the detection signal output from said voltage detection means;
    resume process means for carrying out a resume process when the power is turned ON, said resume process returning the battery powered unit to a state the battery powered unit was at when the power was previously turned OFF, and
    control means, coupled to said judging means, for supplying the output voltage of the battery to drive the battery powered unit if said judging means judges that the remaining capacity of the battery is greater than the predetermined value and for prohibiting the supply of the output voltage of the battery if said judging means judges that the remaining capacity of the battery is less than or equal to the predetermined value.

11. The battery powered unit as claimed in claim 10, wherein said voltage detection means includes an analog-to-digital converter which converts the output voltage of the battery into a digital value and outputs the digital value as the detection signal.

12. The battery powered unit as claimed in claim 10, wherein said voltage detection means includes a comparator which compares the output voltage of the battery with a reference voltage and outputs a signal indicative of a result of the comparison as the detection signal.

13. The battery powered unit as claimed in claim 10, wherein said judging means judges whether or not the remaining capacity of the battery is greater than the predetermined value by judging whether or not the voltage detected by said voltage detection means is greater than a predetermined voltage.

14. The battery powered unit as claimed in claim 10, which further comprises suspend process means for carrying out a suspend process when the power of the battery powered unit is turned OFF, said suspend process storing predetermined information at the time when the power is turned OFF.

15. The battery powered unit as claimed in claim 14, wherein said resume process means reads and restores the predetermined information during the resume process.

16. The battery powered unit as claimed in claim 14, wherein the predetermined information is related to the state of the battery powered unit.

17. A battery powered unit which is driven by an output voltage of a battery when the power is ON, said battery powered unit comprising:

voltage detection means for detecting the output voltage of the battery when the power is turned ON and for outputting a detection signal indicative of the detected voltage;

judging means, coupled to said voltage detection means, for judging whether or not a remaining capacity of the battery is greater than a predetermined value based on the detection signal output from said voltage detection means; and control means, coupled to said judging means, for supplying the output voltage of the battery to drive the battery powered unit if said judging means judges that the remaining capacity of the battery is greater than the predetermined value and for prohibiting the supply of the output voltage of the battery if said judging means judges that the remaining capacity of the battery is less than or equal to the predetermined value.

* * * * *

UNITED STATES PATENT AND TRADEMARK OFFICE
CERTIFICATE OF CORRECTION

PATENT NO. : 5,311,441
DATED : May 10, 1994
INVENTOR(S) : Hideyuki Tayama et al

It is certified that error appears in the above-indentified patent and that said Letters Patent is hereby corrected as shown below:

Column 3, line 47, "Si" should be --S1--.

Column 6, line 37, "I11" should be --111--.

Signed and Sealed this

Fifteenth Day of November, 1994

Attest:

BRUCE LEHMAN

*Attesting Officer*     *Commissioner of Patents and Trademarks*